(12) United States Patent
Lee et al.

(10) Patent No.: US 6,842,257 B2
(45) Date of Patent: Jan. 11, 2005

(54) METHOD FOR INSPECTION OF MAGNETIC DISC EDGE ROLL-OFF

(75) Inventors: Shih-Fu L. Lee, Fremont, CA (US); David S. Kuo, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 269 days.

(21) Appl. No.: 09/975,779

(22) Filed: Oct. 12, 2001

(65) Prior Publication Data
US 2002/0135362 A1 Sep. 26, 2002

Related U.S. Application Data

(60) Provisional application No. 60/274,385, filed on Mar. 9, 2001.

(51) Int. Cl.[7] ............................ G01B 11/24; G01N 21/86
(52) U.S. Cl. .................................... 356/601; 250/559.22
(58) Field of Search ................................. 702/155–157, 702/168, 167, 108, 115; 369/53.1, 53.2, 53.14; 356/601, 600, 615, 625, 627–630, 635, 237.2, 634; 250/559.04, 559.22, 559.14, 559.19; 324/210, 212

(56) References Cited

U.S. PATENT DOCUMENTS

| 5,227,623 A | 7/1993 | Heffner |
| 5,410,439 A | 4/1995 | Egbert et al. |
| 5,497,085 A | 3/1996 | Tian et al. |
| 6,392,749 B1 * | 5/2002 | Meeks et al. ................ 356/634 |

* cited by examiner

Primary Examiner—Zandra V. Smith
Assistant Examiner—Gordon J. Stock, Jr.
(74) Attorney, Agent, or Firm—Morrison & Foerster LLP

(57) ABSTRACT

The invention relates to a method for testing a magnetic disc having a plurality of tracks, and apparatus for such testing. The method includes scanning the magnetic disc along radial lines, storing a sequence of data points representing slopes of a plurality of tracks along the radial lines, operating on the stored set of points to determine a measured average slope for each track around an entire revolution of each track to establish a representative slope for each of the tracks of the plurality of tracks, taking a radial moving average to establish a sequence of data points, and comparing the curvature profile to a pre-established limit to determine suitability of the disc for use in a disc drive.

15 Claims, 8 Drawing Sheets

| Fly Height (nm) | | 11.4 | 10.2 | 8.9 | 7.6 |
|---|---|---|---|---|---|
| cell 1 glide radii (mm) | c1_1 | 47.04 | 46.99 | 46.91 | 46.81 |
| | c1_2 | 47.02 | 46.96 | 46.89 | 46.79 |
| | c1_3 | 46.99 | 46.94 | 46.86 | 46.74 |
| | c1_4 | 47.02 | 46.96 | 46.89 | 46.81 |
| | c1_5 | 47.04 | 46.99 | 46.91 | 46.81 |
| | cell1 avg. | 47.02 | 46.97 | 46.89 | 46.79 |
| cell 2 glide radii (mm) | c2_1 | 47.04 | 47.04 | 47.07 | 46.96 |
| | c2_2 | 47.12 | 47.12 | 47.04 | 46.94 |
| | c2_3 | 47.12 | 47.12 | 47.04 | 46.94 |
| | c2_4 | 47.12 | 47.12 | 47.07 | 46.99 |
| | c2_5 | 47.12 | 47.12 | 47.09 | 46.99 |
| | cell2 avg. | 47.10 | 47.10 | 47.06 | 46.96 |
| cell 3 glide radii (mm) | c3_1 | 47.22 | 47.14 | 47.07 | 46.91 |
| | c3_2 | 47.24 | 47.17 | 47.09 | 46.94 |
| | c3_3 | 47.17 | 47.09 | 46.99 | 46.86 |
| | c3_4 | 47.29 | 47.27 | 47.22 | 46.14 |
| | c3_5 | 47.32 | 47.29 | 47.24 | 46.17 |
| | cell3 avg. | 47.25 | 47.19 | 47.12 | 47.01 |
| cell 4 glide radii (mm) | c4_1 | 47.22 | 47.22 | 47.17 | 47.04 |
| | c4_2 | 47.22 | 47.17 | 47.09 | 46.96 |
| | c4_3 | 47.17 | 47.02 | 47.02 | 46.99 |
| | c4_4 | 47.22 | 47.22 | 47.17 | 47.04 |
| | c4_5 | 47.27 | 47.24 | 47.22 | 47.12 |
| | cell4 avg. | 47.22 | 47.17 | 47.13 | 47.03 |

Figure 8

METHOD FOR INSPECTION OF MAGNETIC DISC EDGE ROLL-OFF

This application claims benefit of U.S. Provisional Application No. 60/274,385, entitled Method for Inspection of Magnetic Disk Edge Roll-Off, filed Mar. 9, 2001 by Shih-Fu L. Lee and David S. Kuo, which is hereby incorporated by reference in its entirety.

FIELD OF THE INVENTION

The present invention is directed to disc drives. More particularly, the present invention provides an efficient and accurate method for determining an outer diameter roll-off for each magnetic disc to be used in a disc drive. The present invention can be implemented during a process of magnetic disc manufacture to assure that discs having at least a preselected maximum radius for a data track band are made available for assembly into a disc drive.

BACKGROUND OF THE INVENTION

Disc drives are commonly used in workstations, personal computers, laptops and other computer systems to store large amounts of data that are readily available to a user. In general, a disc drive comprises a magnetic disc that is rotated by a spindle motor. The surface of the disc is divided into a series of data tracks. The data tracks are spaced radially from one another across a band having an inner diameter and an outer diameter. As should be understood, to maximize the amount of data that can be stored on a disc surface, the inner and outer diameters of the data track band should be as close as possible to the inner and outer diameters of the disc itself.

Each of the data tracks extends generally circumferentially around the disc and can store data in the form of magnetic transitions within the radial extent of the track on the disc surface. An interactive element, such as a magnetic transducer, is used to sense the magnetic transitions to read data, or an electromagnetic element to generate magnetic flux that causes a magnetic transition on the disc surface, to write data. The magnetic transducer includes a read/write gap that contains the active elements of the transducer at a position suitable for interaction with the magnetic surface of the disc.

As known in the art, the magnetic transducer is mounted by a head structure to a rotary actuator and is selectively positioned by the actuator over a preselected data track of the disc to either read data from or write data to the preselected data track of the disc, as the disc rotates below the transducer. The head structure includes a slider having an air bearing surface that causes the transducer to fly above the data tracks of the disc surface due to fluid currents caused by rotation of the disc. The air bearing surface of the slider has a leading edge and a trailing edge. Typically, in currently used heads, such as, e.g., Transverse Pressure Contour (TPC) heads, two spaced rails are arranged to extend longitudinally along the lateral sides of the air bearing surface, one adjacent each lateral side, from the leading edge to the trailing edge of the surface. The rails provide various pressure effects to cause head flying operation.

Thus, the transducer does not physically contact the disc surface during normal operation of the disc drive. The amount of distance that the transducer flies above the disc surface is referred to as the "fly height". It is a design goal to maintain the fly height of the head at an even level regardless of the radial position of the head.

In modern disc drives, a relatively rigid or hard disc is used as the magnetic medium. The disc comprises a hard substrate such as aluminum. Layers of various materials are applied to the surface of the aluminum substrate by, e.g., a sputtering process to provide layers that are substantially smooth and flat. The surfaces obtained from the sputtering process are designed to facilitate an even fly height for the head. The layered materials include a layer of magnetic material to provide the recording medium for the magnetic transitions representing data.

Typically, the outer diameter of the substrate is sloped at the radial outer end of the disc shape. This is referred to as the roll-off of the disc. Thus, at the outer diameter of the disc, the disc surface is no longer flat and usable to sustain a stable fly height of the air bearing surface of the head. Indeed, the flying behavior of the air bearing surface can become unstable if the head moves too far into the roll-off region of the disc, which can result in contact between the head and the disc surface. Any contact between the head and the disc surface may result in damage to the disc or head, leading to early disc drive mechanical failure.

Accordingly, it is important to design the disc drive such that the outer diameter of the data track band is spaced suitably inward from any portion of the disc roll-off region where fly height degradation can occur when reading data from or writing data to data tracks arranged at the outer diameter of the data track band. However, it is desirable that each disc used in a disc drive have a maximum radius relevant to the roll-off region that is equal to or greater than a preselected threshold radius so as to not impact the radial extent of the data track band beyond an acceptable amount.

To that end, during the manufacture of magnetic discs that are to be used in a disc drive, a check should be made of the roll-off radius of each disc as it moves through the manufacturing process, so as to reject any disc having a roll-off radius less than the preselected threshold value. In this manner, each disc made available for assembly into a disc drive will be able to accommodate a maximum data track band width for a maximized data capacity for the drive, without undesirable fly height instability or lack of clearance in the separation of recording head and media at the data tracks near the outer diameter of the data track band.

In a hard disc drive, certain clearance in the separation of recording head and media is required to avoid contacts and unstable flight at high rotation speed. Glide avalanche test is the common methodology used in the disc drive industry to monitor the spacing clearance U.S. Pat. No. 5,410,439. Outer Diameter Glide Avalanche (OD GA) has become an important gauge in qualifying media in recent years as a result of the requirements for low glide avalanche and high utilization of the disc surface. Performance of OD GA is affected by the disc edge roll-off. Thus, the problem of accurately measuring disc roll-off remains.

Conventional technique utilizes a contact profiler, such as Tencor P12, to measure disc topography in the radial direction near the edge of the disc. The dub-off and/or chord height computed from the measured trace is then reported. The dub-off value is defined as the maximum height undulation between two radii of the disc at the outer diameter. However, it has been determined that the dub-off value does not provide adequate information regarding fly height stability for a head positioned at a data track near or at the outer diameter of the data track band. In fact, there is a poor correlation between the dub-off value and fly height performance. Accordingly, the presently known disc measurement procedures do not provide an adequate system or process for achieving a reliable quality control for discs relevant to maximizing data capacity by assuring compliance by each disc with a maximum data band width having fly height stability at the outer diameter of the band.

A method using slope difference between lateral distances of a head width was suggested to improve the accuracy U.S. Pat. No. 5,497,085. However, the algorithm in that patent is still based upon displacement measurements on limited locations, which suffers in both sensitivity and variation of the measurement. The choice of differentiating slopes in the distance of head width limits the lateral resolution of this method, which cannot provide an effective inspection of the maximum available radius in meeting the disc specifications.

SUMMARY OF THE INVENTION

The present invention provides an efficient and accurate method for determining outer diameter roll-off characteristics for a magnetic disc that provide information relevant to fly height stability.

A related objective is to provide a method of classifying discs into related groups based on their roll-off characteristics.

According to the present invention, profile information is developed using radial curvature, based on slope measurements on a rotating disc to monitor the edge profile and predict OD GA performance. According to the present method, in the first step using a slope scan type of instrument, the radial slopes of N radial lines on the disc, which may be subdivided into M circumferential tracks around each disc, are measured. As a next step, the measured slopes of the same circumferential track are averaged for all tracks. As a next step, the radial moving average for the track slopes is then determined, before any derivate is taken. The length of each moving average is chosen to eliminate spikes due to the differentiation, and still maintain a lateral resolution that is much smaller than the width of the head. Then finally, the radial derivative is taken, building a curvature profile from the raw data of slope changes.

By following these steps, a manufacturing specification can be set at the radius where the curvature profile begins to rise up from zero which would be the point at which the roll off would be sufficiently significant that the spacing between the head and the track surface would become unstable.

The present invention can be implemented in a disc manufacturing process to insure that each disc passing through the manufacturing process has an acceptable outer diameter roll-off value that accommodates stable fly height at the outer data tracks of a maximized data track band width. Further, the method could be used to classify the discs into groups, each group having the same or similar roll-off characteristic to meet a manufacturer's design goals or specifications.

BRIEF DESCRIPTION OF THE DRAWINGS

FIG. 8 is a table of glide avalanche data for a plurality of cells of discs.

DETAILED DESCRIPTION OF THE PREFERRED EMBODIMENTS

Figure 1:
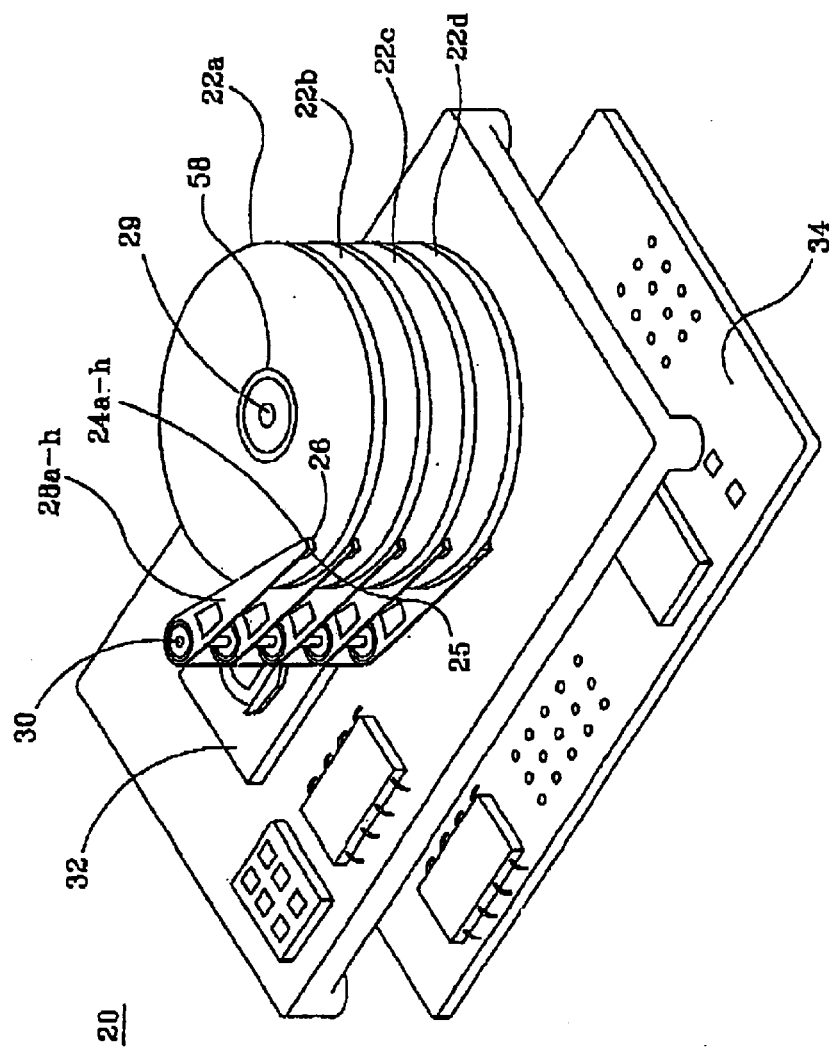
FIG. 1 is a perspective view of a disc drive in which discs evaluated using this method are useful.

Referring now to the drawings, and initially to FIG. 1, there is illustrated an exemplary disc drive designated generally by the reference numeral 20. The disc drive includes a plurality of storage discs 22a–d and a plurality of read/write heads 24a–h. Each of the storage discs 22a–d is provided with a plurality of data tracks to store user data. As illustrated in FIG. 1, one head is provided for each surface of each of the discs 22a–d such that data can be read from or written to the data tracks of all of the storage discs.

The storage discs 22a–d are mounted for rotation by a spindle motor arrangement 29, as is known in the art. Moreover, the read/write heads 24a–h are supported by respective actuator arms 28a–h for controlled positioning over preselected radii of the storage discs 22a–d to enable the reading and writing of data from and to the data tracks. To that end, the actuator arms 28a–h are pivotally mounted on a pivot 30 by a voice coil motor 32 operable to controllably rotate the actuator arms 28a–h radially across the disc surfaces.

Each of the read/write heads comprises a magnetic transducer 25 mounted to a slider 26 having an air bearing surface. As typically utilized in disc drive systems, the sliders 26 cause the magnetic transducers 25 of the read/write heads 24a–h to "fly" above the surfaces of the respective storage discs 22a–d for non-contact operation of the disc drive system, as discussed above. When not in use, the voice coil motor 32 rotates the actuator arms 28a–h to position each of the read/write heads 24a–h over a respective landing zone 58, where the read/write heads 24a–h come to rest on the storage disc surfaces.

A printed circuit board (PCB) 34 is provided to mount control electronics for controlled operation of the spindle motor 29 and the voice coil motor 32. The PCB 34 also includes read/write channel circuitry coupled to the read/write heads 24a–h, to control the transfer of data to and from the data tracks of the storage discs 22a–d. The manner for coupling the PCB 34 to the various components of the disc drive is well known in the art.

Figure 2:
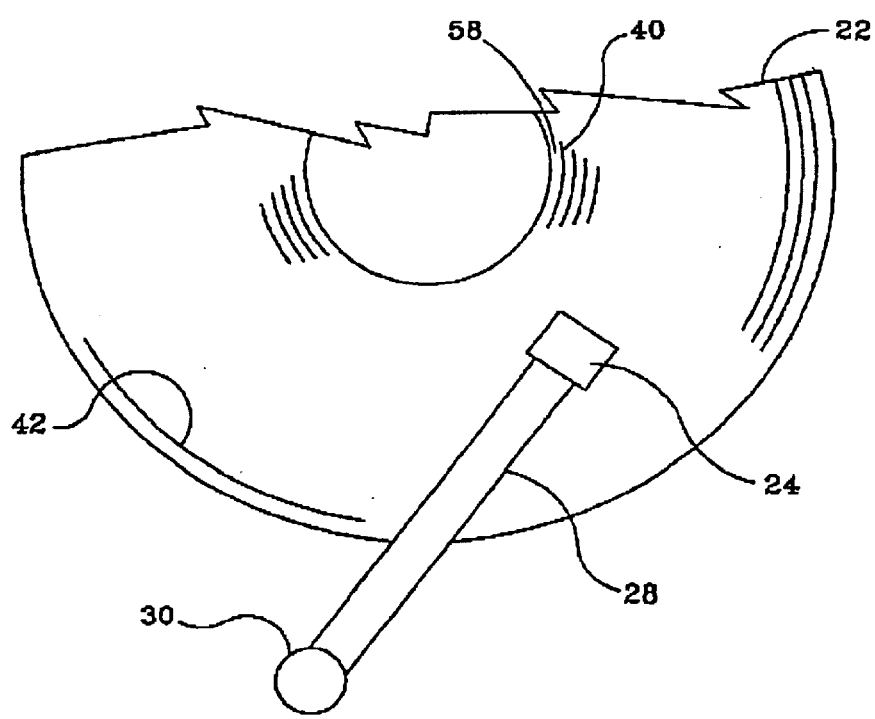
FIG. 2 is an exaggerated view of a portion of one disc showing the tracks and the actuator used to read them.

Referring to FIG. 2, the data tracks extend across each surface of the storage discs 22a–d within a band having an inner diameter 40 and an outer diameter 32. The actuator arms 28a–h are controlled by the control electronics on the PCB 34, during read/write operations, to position the respective heads 24a–h over preselected data tracks within the bands defined by the diameters 40, 42. As should be understood, it is desirable for the outer diameter 42 of each effective disc storage surface to be as close to the outer diameter of the disc 22a–d, as possible, to provide a maximum radial width for storing data on the disc surfaces.

Figure 3A:
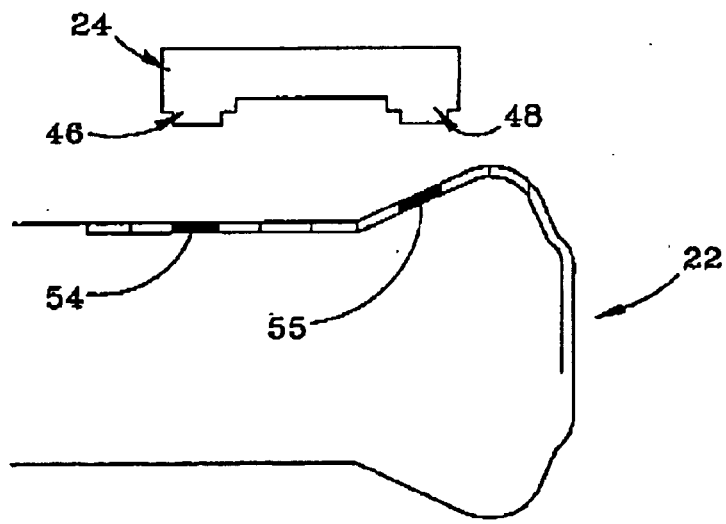
FIGS. 3A and 3B each depict an exploded view of the radially outer end of the disc of FIG. 2, including the head and slider at a fly height of the surface of the disc.
Figure 3B:
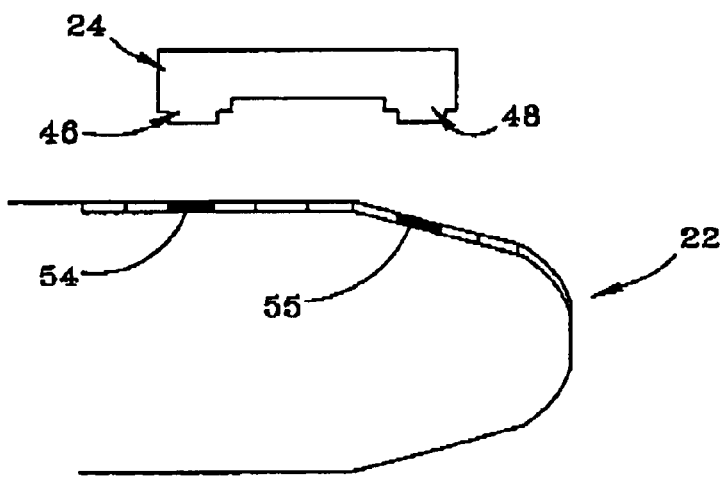

Referring now to FIGS. 3a and 3b, there is illustrated an exploded end view of each of two types of disc ends commonly found in disc drives. In FIG. 3a, the slope of the surface of the disc 22 first moves upward, before turning downward at the outermost diameter of the disc 22. This is referred to as a "ski jump" type disc. In FIG. 3b, the surface of the disc 22 gradually tapers from a flat surface to a curved surface at the outermost diameter of the disc 22. In each of FIGS. 3a and 3b, there is also shown a head 24, including air bearing surfaces comprising rails 46 and 48. The rails 46, 48 cause the head 22 to fly above the surface as shown in the drawing.

As known in the art, the fly height of the head becomes unstable when the rails 46, 48 and particularly outer rail 48, approaches the curved portions of the outer diameter of the disc 22. Thus, the outer diameter 54 of the data track band is placed at a suitable distance from the curved roll-off region to maintain an acceptable and stable fly height of the head 22 during read/write operations at the outer diameter 54. Due to manufacturing tolerances, the precise curved configuration for each particular disc will vary. Accordingly, it is desirable that the curved configuration, as shown in either FIGS. 3a and 3b, for any particular disc 22 assembled into the drive 20 not impact fly height stability within a preselected maximum radius for the outer diameter 54. For these reasons, it is important not to locate the outer diameter track, for example, at location 55 (FIG. 3a or FIG. 3b) within the roll-off region.

Figure 4:
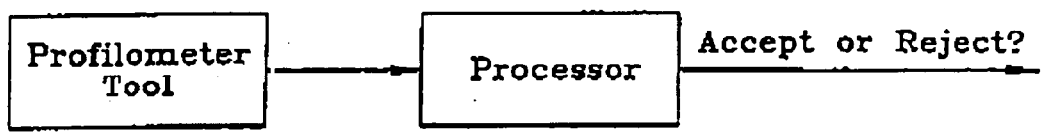
FIG. 4 is a very simplified block diagram of an exemplary quality control disc test system according to present invention.

FIG. 4 shows, in block diagram form, an exemplary quality control test system according to the present invention for screening each disc 22a–d, prior to assembly into the disc drive 20, to make certain that fly height stability is acceptable given the specifications of the disc drive in which the disc is to be used at the selected value for the outer diameter 42 of the data track band. To advantage, the testing according to the present invention can be performed by the quality control system on a substrate prior to sputtering to make a magnetic disc. In this manner, the suitability of a disc is determined at an early stage of a manufacturing process, and the sputtering process to make magnetic discs is performed using substrates that are already shown acceptable in respect of fly height stability.

Figure 5A:
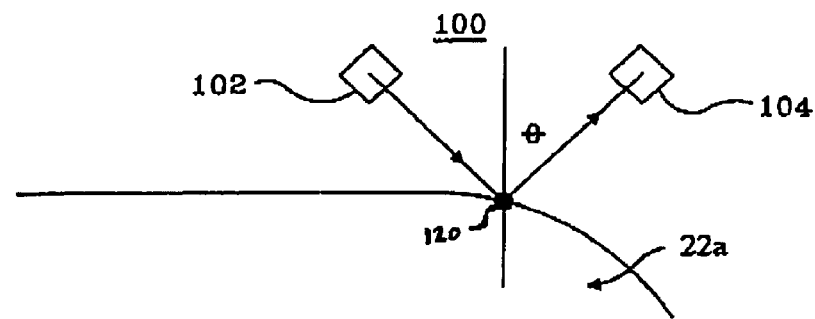
FIGS. 5A and 5B are schematics of a disc and the use of a profilometer to generate data used to develop a curvature profile of the disc.
Figure 5B:
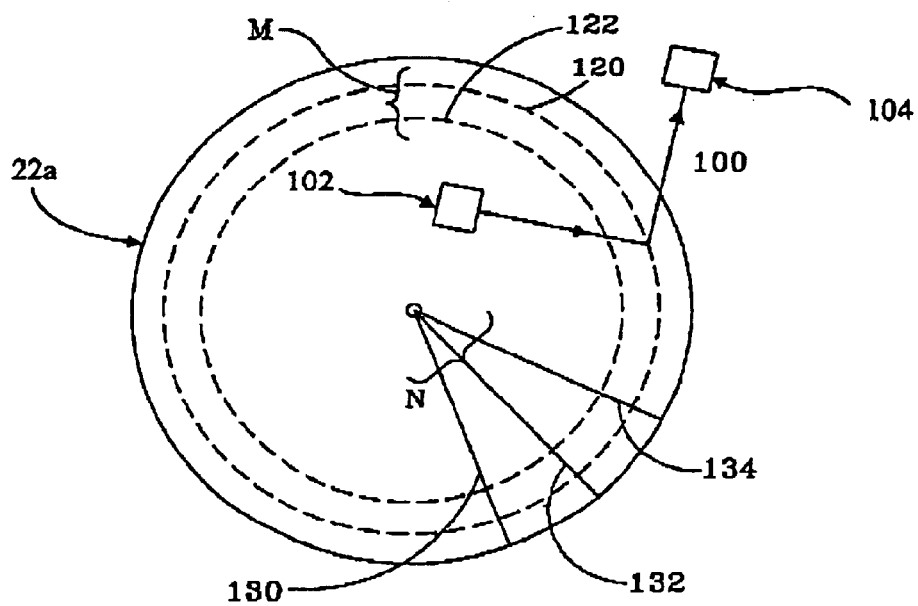

Given the need to accurately detect from disc to disc the point at which such roll-off occurs that the fly height of the slider becomes unstable, as well as the desire to do so in a non-destructive manner, as compared to the destructive testing which is done in the glide avalanche approach, the present invention has been developed. As a first step, a slope scan type of instrument, such as a profilometer 100, shown schematically in FIG. 5A, will be utilized. This comprises at least a laser or equivalent source 102 and detector 104. The output of the laser 102 can be directed to each track, with the reflection off the track being directed to a detector 104 so that the slope angle θ of each track of the outer region of the disc can be accurately detected. While using this or a similar device, the disc is rotated past the profilometer 100 as shown in FIG. 5B so that a very large number of points on a given track 120 can be examined and the slope of the points along the line detected and recorded. This step is repeated for a set of M circumferential tracks shown, for example, as 120, 122 in FIG. 5B, with the data being stored so that a sequence of points representing the slopes of a set of tracks along N radial lines indicated at 130, 132, 134 can be stored. This step is indicated at step 600 in FIG. 6. It should be noted that by rotating the disc and utilizing high speed sampling, it is possible to sample and store data for 30,000 or more radial lines.

Figure 6:
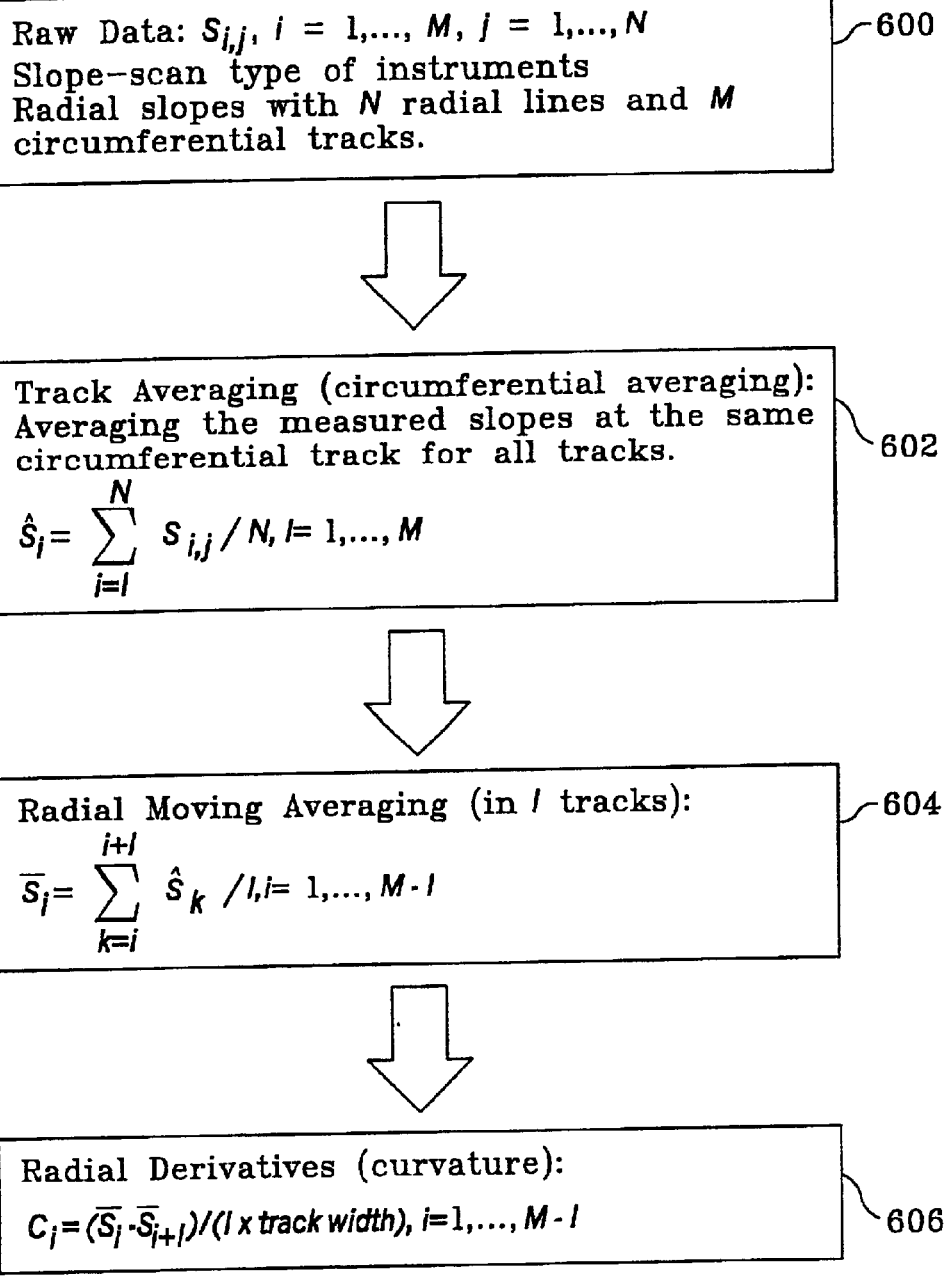
FIG. 6 is a flowchart of the data processing algorithm used to develop the curvature profile according to the present invention.

As a next step 602, as indicated in FIG. 6, a circumferential averaging step is carried out. This circumferential averaging step 602 averages the measured slope at the same circumferential track for each track. This step 602 of taking a track average of an entire revolution for a track is used to obtain a representative slope of each track, tightening the variations due to local differences in a disc and providing a good representation of one revolution around a disc for a given track. The track is assumed to represent a constant distance from the center of the disc.

As the next step 604, a moving average of the slope (developed at step 602) of a plurality of adjacent tracks is generated, before any derivative is taken. The use of the moving average, the sequence of data points for the processor where each point is the moving average for L tracks, where each track is represented by the circumferential average slope for the entire track as developed at step 602. The radial length of the number of tracks L in each moving average developed by the processor is chosen to eliminate spikes from appearing in the differentiation which is to follow, while still maintaining a lateral resolution moving radially across the surface of the disc, which is much smaller than the width of a head. This step 604 provides a measurement of the surface profile of the disc which is much more accurate than approaches taken in the prior art.

After the averaging step, then the derivative is taken, step 606, directly yielding the curvature profile of the disc (as shown for a set of discs in FIG. 7B below).

The result of the method described with respect to FIG. 6 is to provide a very accurate curvature profile moving radially outward across the disc. By using this curvature profile, the disc manufacturer can test discs at the substrate level. The test described determines whether each disc will lend itself to flying a slider at a desired height as established by the disc drive specifications over the surface of the disc without colliding with the disc and while maintaining an idea separation gap from the surface of the disc to optimize recording density and accuracy. This curvature profile is in contrast to the glide avalanche testing method, which essentially comprises flying a slider over the surface of the finished disc periodically moving outwardly along a radius, until the slider collides with the surface of the disc. This glide avalanche method, can only be conducted on a finished disc, and is essentially a destructive testing method, i.e., since there has been a collision between the slider and the surface of the disc, moot discs which have been tested according to the glide avalanche method are considered not usable because of lost surface storage area.

Figure 7A:
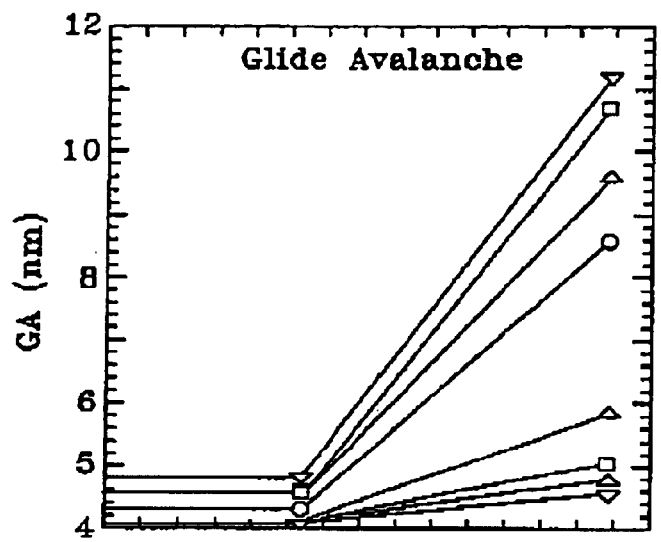
FIGS. 7A and 7B are figures used to illustrate the correlation between OD glide avalanche and OD curvature profiles for a set of discs.
Figure 7B:
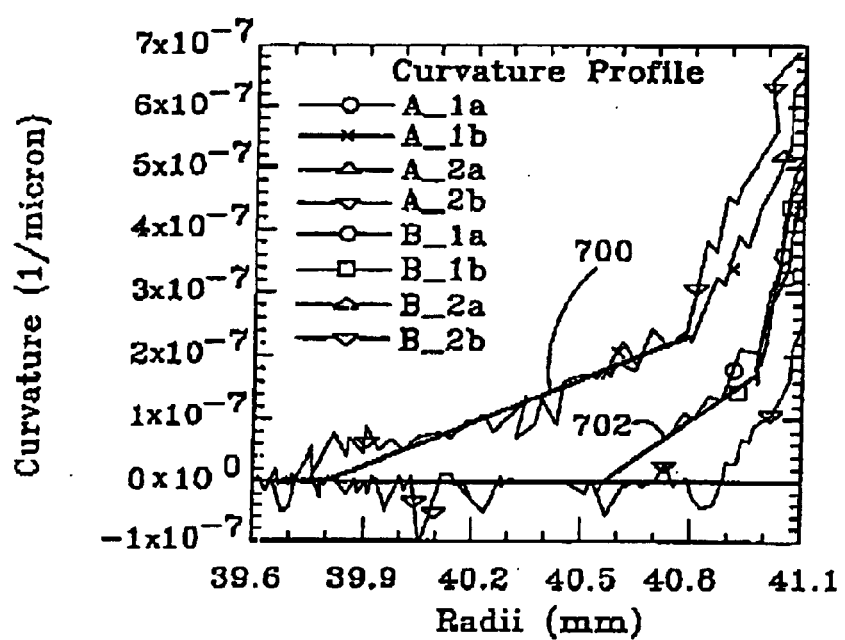

The distinction between glide avalanche testing and the curvature profiling of the present invention becomes more apparent from a study of FIGS. 7A and 7B. FIG. 7A shows the results of glide avalanche testing and can be directly converted into a selection of a appropriate or minimum fly height of the slider over the surface of the disc. Looking at the FIG. 7A, it can be seen that if a slider is flown at a height of 6 nm over the surface of a discs of Group A, that the outer most radii for a data track should be at a height of about 40.2 mm for the discs of Group A, but could extend out as far as about 40.8 mm for the discs of Group B. The data clearly demonstrates that the discs of Group A are weaker and have more curvature than the discs of Group B.

In contrast, using curvature profiling, a more direct measurement of the actual curvature profile of each disc, as tested typically at the substrate level, can be found. To determine an appropriate fly height for any group of discs, this curvature profile is used as an input to a model which also incorporates the desired fly height of the slider. Thus, the curvature profiling of FIG. 7B can be much more sensitive to different models of disc drives utilizing different sliders and different desired fly heights over the surface of the disc. The advantage of the curvature profile developed by the present invention is that it directly provides the user with the curvature of the disc in the region where roll-off occurs. This represents another distinct advantage of this invention over the prior art because the curvature profile, which is shown, for example, in FIG. 7B is slider independent. That is, given the curvature profile, any particular disc drive and particular slider design can be chosen, and then matched with discs, for example, selected from Group A which has a typical profile as shown by the solid line 702 as shown in the figure or the discs of Group B (which has a typical profile or control line 702). Each group of discs has a different typical curvature profile for optimum performance on the particular characteristics of the slider and the desired capacity and other specifications of the disc drive in which the disc or discs are used.

In summary, the objective of this invention is to provide a substrate control tool, which is independent of the type of slider which is to be flown over the finished disc. Thus, by doing some preliminary samples of discs, the user could set the standard either at line control 700 or at control line 702 or any other line that represents a target specification to be met. Then, any substrate which test which fall below the line 700, which represents the target for substrates to be used in a particular disc drive with a particular slider, will be passed. In contrast, for a different disc drive with a different specification and a different slider, the target or standard may be set at profile line 702. Any disc which is above line 702 can be expected to fail when used in that disc, whereas any disc falling below that line is useful and will pass. Obviously, the standard established by profile line 702 is substantially more rigorous than line 700; this process gives the advantage of being able to choose different standards for different disc drives with different specifications and different sliders. Thus, given the profile of line 700, all the discs of Group A are grouped very closely to this line and would probably all pass; all the discs of Group B which are grouped around profile line 702 would certainly pass. In contrast, for the discs of Group B, if the target profile is that of line 702, all the discs of Group B would probably pass since they are grouped close to that profile line. But none of the discs of Group A would pass.

In fact, meeting the entire profile line or part of line 700, or 702 may not be necessary; a single point or points along the profile or control line could be defined as critical, and any substrate which falls below that point would be considered to be useful or successful in the disc drive of choice.

Figure 9A:
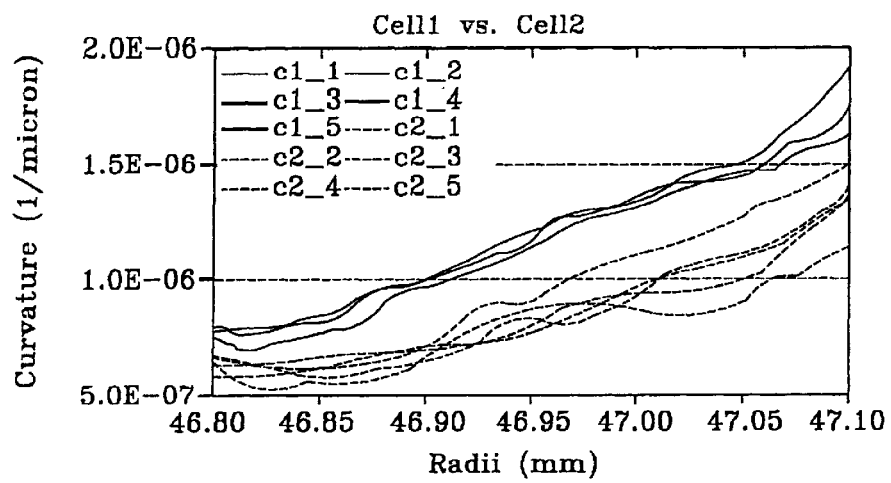
FIGS. 9A and 9B are curvature profiles developed using the present invention illustrated in the correlation between the data developed using the present invention and the data generated by glide avalanche testing according to the prior art.
Figure 9B:
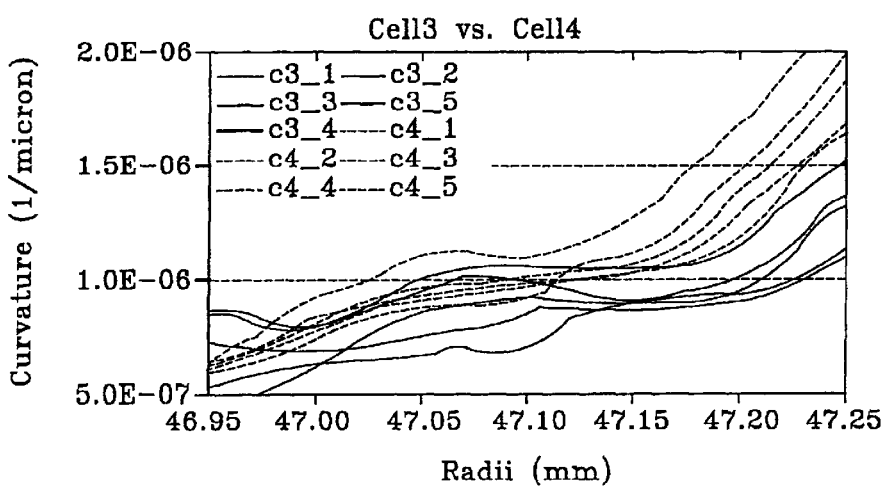

Tables 8 and FIGS. 9A and 9B compare the results of data gained from glide avalanche testing of four different cells or groups of discs (See Table 8). The same cells or groups of discs are also tested using the present curvature profile method. Table 8 records the data as glide radii in mm at tested fly heights (in nm). The average glide radii of each cell is calculated and tabulated in the highlighted rows. For comparison, the substrates of cells 1 and 2 are tested using the method of the present invention, with the results recorded and displayed in FIG. 9A; and cells 3 and 4 are tested and the results recorded and displayed in FIG. 9B. In this experiment, discs of two different OD sizes, were deliberately chosen. The discs in cells 3 and 4 are 0.2 mm larger in OD size than the discs in the cells 1 and 2.

Table 8 reports the results of the glide avalanche testing of all four cells or groups of discs. The discs were tested at given fly heights and the radii at which the glide signals avalanched were recorded. (The avalanche radii being the radius at which the slider makes contact with the disc.) The average of cells 1 and 2 (See Table A) shows a distinguishable difference in glide avalanche performance; the discs of cell 2 have consistently larger glide radii than cell 1 does at all four glide heights. This indicates a distinctly different edge profile between the discs of cells 1 and 2 around these radii. FIG. 9A plots the curvature profile of substrates used to form discs of cells 1 and 2, with a curvature being developed in the range of the glide radii. The distinct separation of the two groups of curvature lines clearly differentiates the two cells in the same way as the new curvature profile testing has differentiated them.

On the other hand, returning again to Table 8, a comparison of the discs of cells 3 and 4 between their average glide radii shows no clear differentiation between them. Similarly, referring to FIG. 9B, the curvature plotted for the substrates used to form the discs, which would be grouped in these two cells are also mixed at these radii. This clearly indicates that the results of the curvature testing of the present invention, while allowing for testing of substrates rather than requiring testing of finished discs, result in highly accurate results which track well the accuracy of glide avalanche testing.

EXAMPLE 1

Considering further the data of FIGS. 7A and 7B, two groups of discs, Group A and Group B, with curvature profiles which have distinguishable differences near the edge, have had their glide avalanche performance tested and recorded in FIG. 7A. It can be seen that all of the Group A discs have a higher glide avalanche reading at 40.9 nm than the Group B discs.

FIG. 7A further shows that the glide avalanche for both sets of discs remains close to the base line at approximately 3.8 nm, but rises up sharply from 40.1 to 41.0 nm.

Moving next to FIG. 7B which shows curvature profiles run on the substrates of the discs tested in FIG. 7A, we see that in Group A the curvature begins to deviate from 0 at about 39.8 mm and deviates from 0 for Group B at about 40.5 mm. Thus this curvature profiling explains why for the GA at a radius of 40.1 mm remains close to the baseline for both of the groups (although Group A already has a somewhat higher GA) that jumps up sharply when the head moves out 0.9 and to about 41.0 mm. The conclusions to be drawn are that the disc substrate can be qualified by the radius where the curvature starts to rise up from zero, and secondly that the curvature profile yields results which can be correlated with, but are more accurate than the glide avalanche profiling.

Other features and advantages of this invention will be apparent to a person of skill in the art who studies this disclosure. Therefore, the scope of the invention is to be limited only by the following claims.

What is claimed is:

1. A method for testing a magnetic disc to be used in a disc drive, the magnetic disc having a plurality of tracks, comprising the steps of:

rotating the magnetic disc;

scanning the magnetic disc along radial lines;

storing a sequence of data points representing slopes of a plurality of tracks along the radial lines;

operating on the stored sets of points to determine a measured average slope for each track of said plurality of tracks around an entire revolution of said each track to establish a representative slope for each of the tracks of the plurality of tracks;

taking a radial moving average to establish a sequence of data points, each data point being an average for a plurality of the tracks, and each track is represented by its representative slope;

taking a radial derivative of the sequence of data points on the surface of the disc;

building a curvature profile of the disc; and comparing said curvature profile to a pre-established limit to determine suitability of the disc for use in a disc drive, wherein the step of taking a radial moving average comprises developing an average over a plurality of tracks sufficient in number to eliminate spikes from appearing in a subsequent step.

2. A method as claimed in claim 1, wherein the step of comparing the curvature profile to a pre-established limit comprises the step of comparing the curvature profile to a pre-established profile for an acceptable disc.

3. A method as claimed in claim 1, wherein:

the disc drive comprises a read/write head for reading and writing data on a surface of a magnetic disc, and the radial length of the radial moving average is smaller than a width of the head.

4. A method as claimed in claim 3, further comprising the steps of:

providing a plurality of desirable curvature profiles; and assigning each disc to a group around a desired curvature profile.

5. A method as claimed in claim 4, wherein the step of providing a plurality of desirable curvature profiles establishes each profile according to desired characteristics of a head and slider to be used in the disc drive.

6. A method for testing a magnetic disc to be used in a disc drive, the magnetic disc having a plurality of tracks, comprising the steps of:

rotating the magnetic disc;

scanning the magnetic disc along radial lines;

storing a sequence of data points representing slopes of a plurality of tracks along the radial lines;

operating on the stored sets of points to determine a measured average slope for each track of said plurality of tracks around an entire revolution of said each track to establish a representative slope for each of the tracks of the plurality of tracks;

taking a radial moving average to establish a sequence of data points, each data point being an average for a plurality of the tracks, and each track is represented by its representative slope;

taking a radial derivative of the sequence of data points on the surface of the disc;

building a curvature profile of the disc; and comparing said curvature profile to a pre-established limit to determine suitability of the disc for use in a disc drive, wherein the method of testing is performed on a substrate of the magnetic disc prior to deposition of any recording layers on the magnetic disc.

7. A method as claimed in claim 6, wherein the step of determining a measured slope for each track comprises:

calculating a slope at each of a plurality of points along a track around the circumference of the disc; and taking an average of the calculated slopes for the track.

8. A method as claimed in claim 7, wherein the step of taking an average of the calculated slopes for a track is used to obtain a representative slope of each track, and wherein the track is assumed to represent a constant distance from a center of the disc.

9. A method for testing a magnetic disc to be used in a disc drive, the magnetic disc having a plurality of tracks, comprising the steps of:

rotating the magnetic disc;

scanning the magnetic disc along radial lines;

storing a sequence of data points representing slopes of a plurality of tracks along the radial lines;

operating on the stored sets of points to determine a measured average slope for each track of said plurality of tracks around an entire revolution of said each track to establish a representative slope for each of the tracks of the plurality of tracks;

taking a radial moving average to establish a sequence of data points, each data point being an average for a plurality of the tracks, and each track is represented by its representative slope;

taking a radial derivative of the sequence of data points on the surface of the disc;

building a curvature profile of the disc; and comparing said curvature profile to a pre-established limit to determine suitability of the disc for use in a disc drive, wherein the method is performed on an aluminum substrate prior to deposition of any recording layers on the magnetic disc.

10. A method for testing a magnetic disc to be used in a disc drive, comprising the steps of:

providing a profilometer, utilizing the profilometer to determine slopes at a plurality of points along a number of radii of the disc representing a number of tracks near the outer edge of the disc;

determining an average slope for each track of the disc from the slopes determined at a plurality of points around the circumference of the track;

developing along each of the number of radii of the disc a series of radial moving averages over the tracks of the discs, each radial moving average comprising a radial length sufficient to encompass a plurality of tracks, wherein, the radial length is chosen to eliminate spikes from appearing in a differentiation step;

differentiating the radial moving averages to establish a radial profile of the disc; and comparing each radial profile to one or more pre-established curvature profiles to establish the utility of the disc in a disc drive having certain operating characteristics.

11. A method as claimed in claim 10, wherein the slopes determined at the plurality of points for each track on the disc comprises the slope angle of each track on the disc moving circumferentially around the disc.

12. A method as claimed in claim 10, wherein the steps of the method are performed on a disc substrate.

13. A method as claimed in claim 12, wherein:

the disc drive comprises a read/write head for reading and writing data on a surface of a magnetic disc;

disc drive has operating characteristics represented by a curvature profile to which the curvature profile of the tested disc is matched; and the radial length of each moving average is less than the width of the head to be used in the disc drive.

14. A method as claimed m claim 13, further comprising the step of;

comparing the curvature profile of each disc substrate tested to one or more curvature profiles, each said profile representing operating characteristics for a particular disc drive with a particular slider.

15. An apparatus for testing a magnetic disc to be used in a disc drive, the magnetic disc having a plurality of tracks, comprising:

means for scanning the magnetic disc along radial lines;

means for storing a sequence of data points representing slopes of a plurality of tracks along the radial lines;

means for operating on the stored sets of points to determine a measured slope for each track in a disc region where roll-off is to be determined;

means for taking a radial moving average along a plurality of the radial lines on the disc, each radial moving average comprising a radial length sufficient to encompass a plurality of tracks; wherein the radial length is chosen to eliminate spikes from appearing in a differentiation process;

means for taking a radial derivative along the plurality of the radial lines on the surface of the disc so as to provide the differentiation process;

means for building a curvature profile from the derivatives along the plurality of the radial lines; and means for comparing said curvature profile to a pre-established limit to determine suitability of the disc for use in a disc drive.

* * * * *